US009661140B2

(12) United States Patent
Abou-Chakra et al.

(10) Patent No.: US 9,661,140 B2
(45) Date of Patent: May 23, 2017

(54) METHOD AND A MODULE FOR SHIFTING A CALL ESTABLISHED THROUGH A FIRST APPLICATION SERVER IN ORDER TO ROUTE IT THROUGH A SECOND APPLICATION SERVER

(71) Applicant: Alcatel Lucent, Boulogne Billancourt (FR)

(72) Inventors: Rabih Abou-Chakra, Colombes (FR); Jean-Francois Leroy, Brest (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/648,377

(22) PCT Filed: Oct. 21, 2013

(86) PCT No.: PCT/EP2013/071946
§ 371 (c)(1),
(2) Date: May 29, 2015

(87) PCT Pub. No.: WO2014/082791
PCT Pub. Date: Jun. 5, 2014

(65) Prior Publication Data
US 2015/0304501 A1 Oct. 22, 2015

(30) Foreign Application Priority Data
Nov. 30, 2012 (EP) .................... 12306491

(51) Int. Cl.
*H04M 3/42* (2006.01)
*H04M 3/56* (2006.01)
(Continued)

(52) U.S. Cl.
CPC ........... *H04M 3/56* (2013.01); *H04M 3/4228* (2013.01); *H04M 3/4234* (2013.01);
(Continued)

(58) Field of Classification Search
CPC ..................................... H04M 3/56
(Continued)

(56) References Cited

U.S. PATENT DOCUMENTS 5,867,494 A * 2/1999 Krishnaswamy et al. .... 370/352
6,826,272 B1 * 11/2004 Dalrymple et al. ..... 379/220.01
(Continued)

FOREIGN PATENT DOCUMENTS

CN 101171856 A 4/2008
CN 101420669 A 4/2009
(Continued)

OTHER PUBLICATIONS

International Search Report for PCT/EP2013/071946 dated Dec. 10, 2013.

*Primary Examiner* — Santiago Garcia
(74) *Attorney, Agent, or Firm* — Fay Sharpe, LLP

(57) ABSTRACT

A method for shifting an original call established between a first user device (1) and at least a correspondent device (2) through a first application server (3) in order to route it through a second application server (4), the method comprising—instructing the first application server (1) to forward the original call through the second application server (4) to the first user device (1) upon receiving the application server shift instruction, the first application server being instructed to establish a three-way conference communication between the first user device (1), the correspondent device (2) and the second application server (4) in order to forward the original call from the first application server (3) to the second application server (4); —determining that an incoming call routed from the second application server (4) to the first user device (1) has an identification information matches identification information of the original call; —causing the first user device (1) to pick-up the incoming call routed from the second application server (4) to the first user device (1) and instructing to release the call branch between the first application server (3) and the first user device (1) upon determining that the identification information matches.

11 Claims, 2 Drawing Sheets

(51) Int. Cl.
*H04Q 3/66* (2006.01)
*H04W 4/16* (2009.01)

(52) U.S. Cl.
CPC .......... *H04M 3/42059* (2013.01); *H04Q 3/66* (2013.01); *H04W 4/16* (2013.01); *H04Q 2213/13141* (2013.01)

(58) Field of Classification Search
USPC ........................................................ 455/413
See application file for complete search history.

(56) References Cited

U.S. PATENT DOCUMENTS

| | | | |
|---|---|---|---|
| 7,457,638 | B2 | 11/2008 | Dhillon et al. |
| 7,912,039 | B1* | 3/2011 | Croak et al. ................. 370/352 |
| 8,358,757 | B2* | 1/2013 | Soo et al. ................. 379/93.01 |
| 2006/0234747 | A1* | 10/2006 | Pan ............................... 455/519 |
| 2008/0201143 | A1* | 8/2008 | Olligschlaeger et al. .... 704/235 |
| 2008/0317234 | A1* | 12/2008 | Di Fabbrizio et al. .. 379/211.01 |
| 2009/0168985 | A1* | 7/2009 | Yu et al. ................. 379/202.01 |
| 2010/0041398 | A1* | 2/2010 | Sand et al. .................... 455/433 |
| 2010/0067519 | A1* | 3/2010 | Mang et al. .................. 370/352 |
| 2010/0104074 | A1* | 4/2010 | Yang ......................... 379/88.13 |
| 2010/0202447 | A1 | 8/2010 | Long et al. |
| 2011/0003579 | A1* | 1/2011 | Cai et al. ...................... 455/408 |
| 2011/0075828 | A1* | 3/2011 | Okita et al. .............. 379/201.02 |
| 2011/0185069 | A1* | 7/2011 | Zetterlund .................... 709/227 |
| 2011/0250870 | A1* | 10/2011 | Silva ......................... 455/412.1 |
| 2013/0094671 | A1* | 4/2013 | Zhou et al. ................... 381/119 |

FOREIGN PATENT DOCUMENTS

FR 2 935 858 A1 3/2012
WO WO 2010/029523 A2 3/2010

* cited by examiner

METHOD AND A MODULE FOR SHIFTING A CALL ESTABLISHED THROUGH A FIRST APPLICATION SERVER IN ORDER TO ROUTE IT THROUGH A SECOND APPLICATION SERVER

FIELD OF THE PRESENT INVENTION

The present invention relates to telecommunications and in particular to methods and systems for shifting a call established between a first user device and a correspondent device through a first application server in order to route it through a second application server.

BACKGROUND

Some private application servers, such as enterprise communication application servers, provide much more communication services than public network communication application servers. Enterprise communication servers typically provide supplementary services such as call recording, video conferencing, consultation calls, transferring, call shifting between a set of user terminal devices, and others.

When a user, who is a registered subscriber of such a private application server, happens to initiate or receive a communication directly through the public network, he is not in position to benefit from the full services of the private application server, e.g. his enterprise application server. For example, the user involved in a mobile communication, managed by a mobile network telephony application server, cannot escalate this communication to a full collaboration session, this escalation capability being only available through his enterprise communication application server, which is not involved in the communication so far.

Therefore, in order to benefit from the supplementary services of the private application server, the user must hang-up the communication and, then, he re-establishes the call using the private application server. To that end, the user needs to choose the private application server, re-find the contact of the other user and establish a new call through the private application server.

Such process is bothersome, time consuming and should therefore be avoided.

FR 2 935 858 discloses a telecommunication method that allows shifting a call established through a server of the public network in order to route it to an enterprise application server. FR 2 935 858 discloses that a first user terminal may send a server shift instruction and that upon a server shift instruction has been received, the public network is instructed to reroute the call towards the enterprise application server.

The public network stops the call with the terminal of the first user, suspends the call with the correspondent device and performs a call towards the enterprise application server. Then, the enterprise application server establishes a call with the terminal of the first user which accepts the call.

SUMMARY

Various embodiments provide a method and module for automatically shifting a call established through a first application server in order to route it through a second application server.

In a first embodiment, a method for shifting an original call established between a first user device and a correspondent device through a first application server in order to route it through a second application server is provided. The method comprises:
- receiving a server shift instruction;
- instructing the first application server to forward the original call through the second application server to the first user device upon receiving the application server shift instruction, the first application server being instructed to establish a three-way conference communication between the first user device, the correspondent device and the second application server in order to forward the original call from the first application server to the second application server;
- determining that an incoming call routed from the second application server to the first user device has an identification information which matches identification information of the original call;
- causing the first user device to pick-up the incoming call routed from the second application server to the first user device and instructing to release the call branch between the first application server and the first user device upon determining that the identification information matches.

Thus, the call can be automatically shifted through the second application server and the users can benefit from the full services of the second application server.

Thanks to these features, the call can be shifted seamlessly.

In some embodiments, such a method may comprise one or more of the features below:
- the method comprises a step of instructing the first application server to tag the original call forwarded from the first application server to the second application server in order to generate identification information of the original call;
- the method comprises a preliminary step of determining that there is a valid route between the second application server and the first user device;
- the method comprises receiving a notification that an original call is established between the first user device and the correspondent device through the first application server and sending an invitation to shift the call through the second application server;
- the method comprises providing the first application server with the second application server address and information representative of the first user device address, the said information representative of the first user device address being a first user device address or a unique contact address assigned to the first user in order to forward the original call from the first application server to the second application server and route it to the first user device.

In a second embodiment, a module for shifting an original call established between a first user device and a correspondent device through a first application server in order to route it through a second application server is provided. The module comprises:
- an engine which is configured to:
  - instruct the first application server to forward the original call through the second application server to the first user device upon receiving an application server shift instruction, the first application server being instructed to establish a three-way conference communication between the first user device, the correspondent device and the second application server in order to forward the original call from the first application server to the second application server;

determine that an incoming call routed from the second application server to the first user device has an identification information matches identification information of the original call;

cause the first user device to pick-up the incoming call routed from the second application server to the first user device upon and cause releasing of the call branch between the first application server and the first user device determining that the identification information matches.

In some embodiments, such a module may comprise one or more of the features below:

the engine is configured to instruct the first application to tag the call forwarded from the first application server to the second application server in order to generate identification information of the original call;

the engine is configured to determine that there is a valid route between the second application server and the first user device;

the module comprises a control user interface or a control user interface connector and the engine is configured to generate through the control user interface or the control user interface connector an invitation to shift the call through the second application server, upon detecting that the original call is established between the first user device and the correspondent user device through a first application server;

the module comprises application servers connectors for connecting the said module to the first and the second application servers; and/or the module comprises a device telephony resources connector for connecting the said module to the first user device.

According to a third embodiment, a system comprising an application server and a module according to the second embodiment associated with the application server is provided.

According to a fourth embodiment, a system comprising a user device and a module according to the second embodiment associated with the user device is provided.

BRIEF DESCRIPTION OF THE DRAWINGS

These and other aspects of the present invention will be apparent from and elucidated with reference to the embodiments described hereinafter, by way of example, with reference to the drawings.

DETAILED DESCRIPTION OF THE EMBODIMENTS

The described exemplary embodiment relates to a method and module for shifting a call established through a first application server 3, such as a public application server, in order to route it through a second application server 4, such as a private application server, in a SIP (Session Initiation Protocol) supporting network such as an IMS (Internet Multimedia subsystem) network. However, though the invention may be applied within the scope of the IMS network, it may also apply to other architectures.

Typically, the second application server 4 can provide users with many more services such as recording, video conferencing, consultation calls, transferring, call shifting between a set of user terminal devices.

Figure 2:
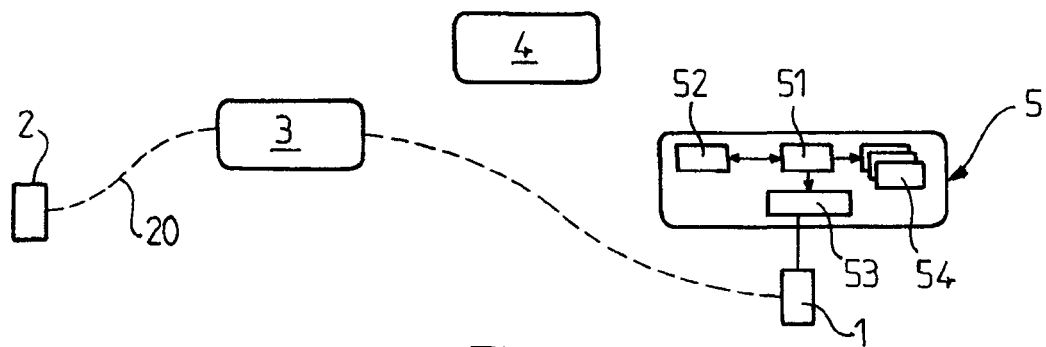
FIG. 2 is a diagram showing a network wherein a call is established between a first user device and a correspondent device through the first application server.
Figure 3:
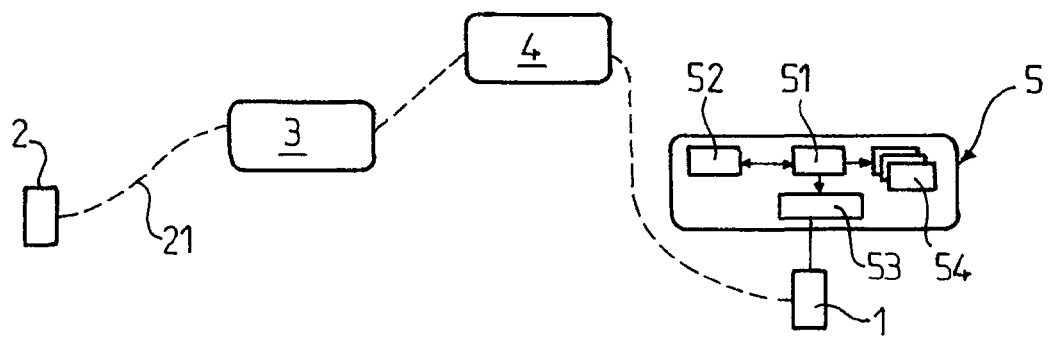
FIG. 3 is a diagram showing the network of FIG. 2 wherein the call has been shifted so that the call is now routed through a second application server.
Figure 4:
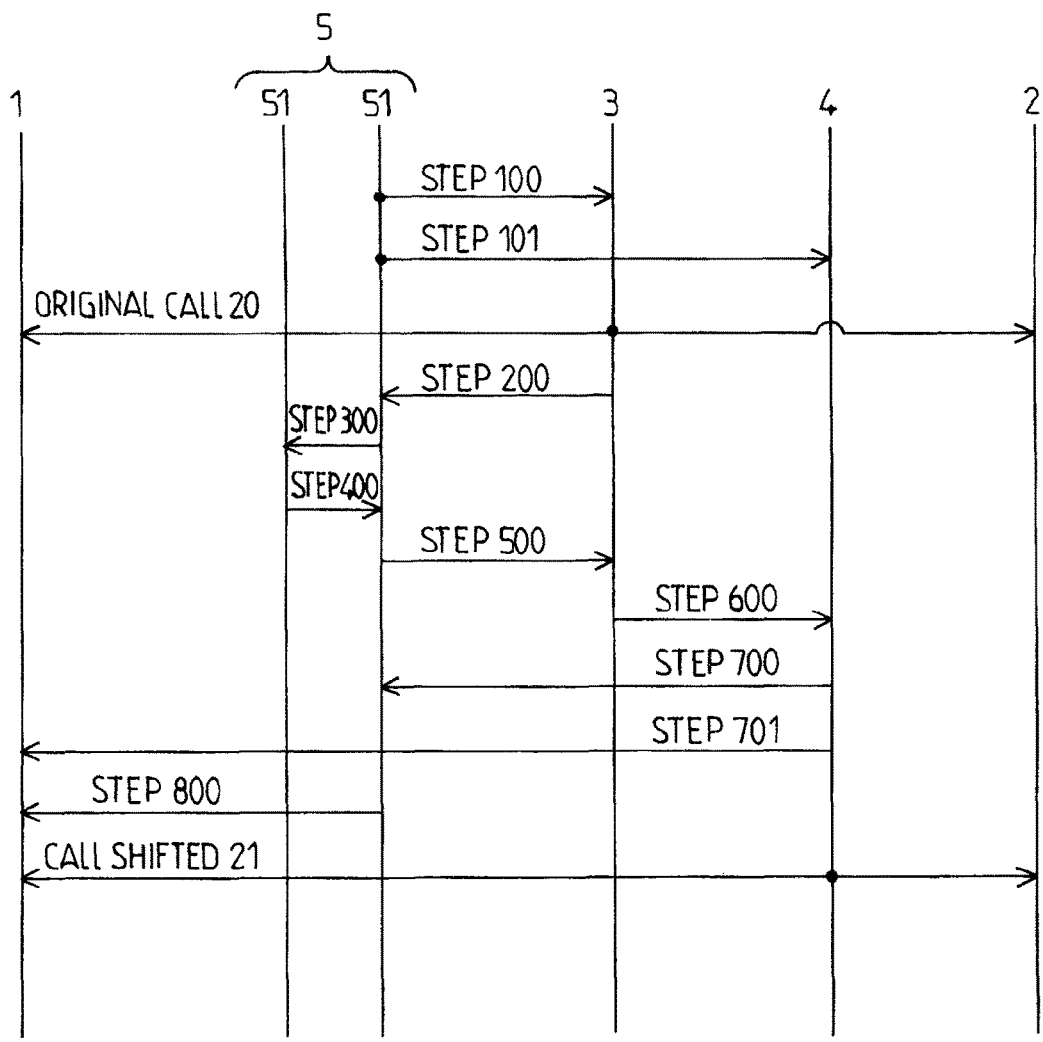
FIG. 4 is a time diagram illustrating the steps of a method according to an embodiment.

The network, illustrated in FIGS. 2 and 3, comprises a first user device 1, a correspondent device or second user device 2, a first application server 3, a second application server 4 and a module 5 for shifting a call established through the first application server 3 in order to establish it through the second application server 4. The module 5 is referred to as CAS module 5, for Communication Application Shift module, in the hereinafter description.

The first user device 1 and the correspondent device 2 may be any kind of telecommunication end user equipment, such as mobile phones, personal digital assistants, fixed phones, etc.

Moreover, the invention is not limited to embodiments in which the network comprises only two application servers and may also be applied with any number n of application servers, n being two or more.

Figure 1:
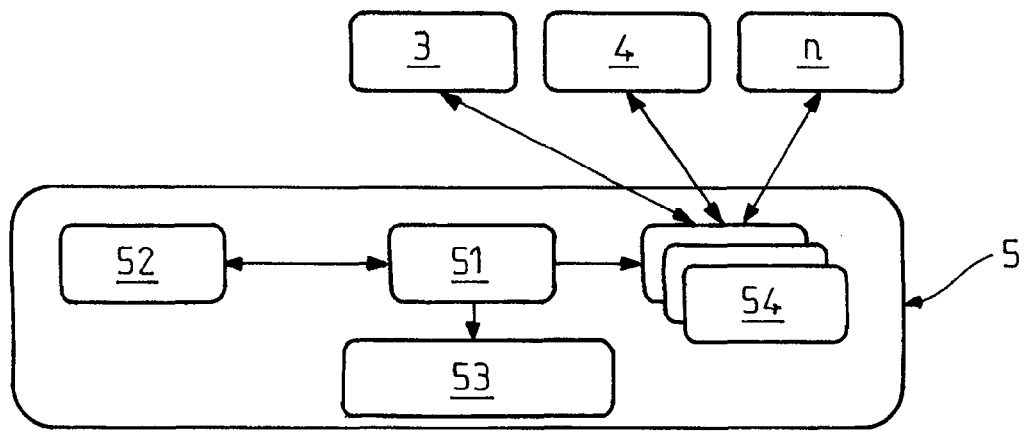
FIG. 1 is a functional diagram showing the architecture of a module for shifting an original call established between a first user device and a correspondent device through a first application server in order to establish it through a second application server.

The CAS module 5, shown in detail in FIG. 1, comprises an engine 51, a control user interface 52, a device telephony resources connector 53 for connecting the said CAS module 5 to at least the first user device 1 and application server connectors 54 for connecting the said CAS module 5 to the n application servers: the first 3 and the second 4 application servers in the illustrated embodiment.

The engine 51 is a microcontroller or a microprocessor associated with a memory and suitable software or software program.

The CAS module 5 may be implemented in the first user device and/or in any one of the application servers.

The CAS module 5 may have its own control user interface 52 but it may also use the control user interface of the first user device 1 through a suitable control user interface connector. The control user interface 52 enables the end user to be notified about an established original call and to communicate application server shift instruction to the CAS module 5. Alternatively, instructions for the CAS module 5 are entered through the control user interface of the first user device 1 via the control user interface connector.

The method for shifting a call according to an embodiment will now be described in detail.

As a preliminary step (STEP 100, STEP 101), the engine 51 of the CAS module 5 subscribes to both the first 3 and the second 4 application servers through their application server connectors 54 and their respective control interfaces, not shown in details.

Of course, the first user is a registered subscriber of the first application server 3 and the second application server 4.

In an embodiment, the second application server 4 provides services which allow a user having a set of user devices to answer a call with anyone of his devices and/or to shift a call between his devices. To that end, the second application server 4 is linked to a user profile register which assigns to the first user a unique contact address which can be used to address a call to a set of first user devices.

The CAS module 5 is informed of any call directed to the first application user through any of the first 3 and second 4 application servers. The engine 54 is also able to determine whether there is a valid route between the first application server 3 and the first user device 1, whether there is a valid route between the second application server 4 and the first user device 1 and whether there is a valid route between the first 3 and the second 4 application server.

When an original call is started or received from/by the first user device 1 through the first application server 3 so that a call 21 is established between the first user device 1 and the correspondent device 2 through the first application server 3, as shown in FIG. 1, the method for shifting can be implemented as follows.

As long as a call 20 is established through the first application server 3, the engine 51 of the CAS module 5 received a notification from the first application server through the relevant application server connector 54 that an original call is established between the first user device 1 and the correspondent device 2 through the first application server 3 (STEP 200). Then, the engine 51 checks whether an application server shift instruction is received from the first user via the control user interface 52 or via the first user device 1 through the control user interface connector. In a preferred embodiment, the engine 51 also generates an invitation (STEP 300) to offer the first user with a capability to shift the call through the second application server 4. The invitation can be made visible to the first user through the control user interface 52 so that the first user can trigger an application server shift instruction through the control user interface. Alternatively, the invitation can be made visible to the first user through to the first user device 1 so that the first user can trigger an application server shift instruction through the first user device 1.

The invitation to shift the call 21 may explicitly invite the first user to shift the call through the second application server or may invite the first user to benefit from one or several services which are only available through the second application server 4. The invitation may be implemented as an icon on a touch screen or any similar trigger.

According to another embodiment, an application server shift instruction may be automatically triggered in response to receiving the invitation from the CAS module 5.

Upon an application server shift instruction being received (STEP 400), the engine 51 instructs the first server application 3 through the relevant application server connectors 54 to forward the call from the first application server 3 to the second application server 4 (STEP 500).

During the forward instruction step (STEP 500), the engine 51 provides the first application server 3 with the second application server 4 address and, optionally, first user address information representative of the first user device address or of the first user himself. The first user address information may be the address of the first user device 1 for the second application server 4 or a unique contact address assigned to the first user himself. In that case, as previously mentioned, the user address is mapped to a set of devices of the first user which comprises the first user device 1.

According to an embodiment, the engine 51 instructs the first server application 3 to transfer the call to the second application server 4. In a more advantageous embodiment, the engine 51 instructs the first server application 3 to establish a conference communication between the first user device 1, the correspondent device 2 and the second application server 4. The instruction to transfer the call or to establish a conference communication is, for instance, a set of instructions, such as an INVITE and/or RE-INVITE SIP requests.

The engine 51 may also instruct the first application server 3 to tag the call in order to generate identification information of the original call.

The original call is thus tagged and forwarded from the first application server 3 to the second application server 4 (STEP 600). Then, the call is routed from the second application server 4 to the first user device 1 (STEP 700). The CAS module 5 is simultaneously informed by the second application server 4 through the application server connector 54 of the incoming call routed from the second application server 4 to the first user device 1 (STEP 701).

As a result of step 701, an incoming call is received on the first user device 1. The engine 51 determines whether the incoming call routed from the second application server 4 has identification information which matches identification information of the original call. The identification information may be a call ID or the tag which has been generated by the first application server 3 and communicated to CAS module 5.

If the identification information matches, the engine 51 instructs the first user device 1 via the device telephony resources connector 53 to automatically pick-up the call routed from the second application server 4 (STEP 800).

In the more advantageous embodiment, in which a three-way conference communication is established by the first application server 3 between the first user device 1, the correspondent device 2 and the second application server 4, the engine 51 instructs the first user device 1 through the device telephony resources connector 53 to pick-up the incoming call routed from the second application server 4 and to release the call branch between the second application server 4 and the first user device 1 (STEP 800). Depending on multiline capability of the first user device 1, the picking-up and the releasing can be simultaneous so that the call is shifted seamlessly or the call routed from the first application server 3 is firstly released and then the call routed from the second application server 4 is picked-up.

The communication call 21 is thus established between the first user device 1 and the correspondent device 2, via the second application server 4 and eventually via the first application server 3, so that the users can benefit from the full services of the second application server 4 (see FIG. 2).

The methods described hereinabove may be executed through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use

The invention claimed is:

1. A method for shifting an original call established between a first user device and a correspondent device through a first application server in order to route it through a second application server, the method comprising:
   receiving a notification that the original call is established between the first user device and the correspondent device through the first application server and sending an invitation to shift the call through the second application server;
   receiving a server shift instruction;
   instructing the first application server to forward the original call through the second application server to the first user device upon receiving the server shift instruction, the first application server being instructed to establish a three-way conference communication between the first user device, the correspondent device and the second application server in order to forward the original call from the first application server to the second application server;
   determining that an incoming call routed from the second application server to the first user device has an identification information which matches identification information of the original call; and
   causing the first user device to pick-up the incoming call routed from the second application server to the first user device and instructing to release the call branch between the first application server and the first user device upon determining that the identification information matches.

2. A method according to claim 1, comprising an instructing the first application server to tag the original call forwarded from the first application server to the second application server in order to generate identification information of the original call.

3. A method according to claim 1, comprising a determining that there is a valid route between the second application server and the first user device.

4. A method according to claim 1, comprising providing the first application server with the second application server address and information representative of the first user device address, the said information representative of the first user device address being the first user device address or a unique contact address assigned to the first user in order to forward the original call from the first application server to the second application server and route it to the first user device.

5. A module for shifting an original call established between a first user device and a correspondent device through a first application server in order to route it through a second application server, the module comprising:
   an engine which is configured to:
      instruct the first application server to forward the original call through the second application server to the first user device upon receiving an application server shift instruction, the first application server being instructed to establish a three-way conference communication between the first user device, the correspondent device and the second application server in order to forward the original call from the first application server to the second application server;
      determine that an incoming call routed from the second application server to the first user device has an identification information matches identification information of the original call;
      cause the first user device to pick-up the incoming call routed from the second application server to the first user device and cause releasing of the call branch between the first application server and the first user device upon determining that the identification information matches;
   wherein the engine is further configured to generate through a control user interface or a control user interface connector an invitation to shift the call through the second application server, upon detecting that the original call established between the first user device and the correspondent device through a first application server.

6. A module according to claim 5, wherein the engine is configured to instruct the first application server to tag the original call forwarded from the first application server to the second application server in order to generate identification information of the original call.

7. A module according to claim 5, wherein the engine is configured to determine that there is a valid route between the second application server and the first user device.

8. A module according to claim 6, comprising application servers connectors for connecting the said module to the first and the second application servers.

9. A module according to claim 6, comprising a device telephony resources connector for connecting the said module to the first user device.

10. A system comprising a module according to claim 5, associated with an application server.

11. A system comprising a module according to claim 5, associated with a user device.

* * * * *